US00RE38337E

(19) United States
(12) Reissued Patent
Beale

(10) Patent Number: US RE38,337 E
(45) Date of Reissued Patent: Dec. 2, 2003

(54) CENTERING SYSTEM FOR FREE PISTON MACHINE

(75) Inventor: William T. Beale, Athens, OH (US)

(73) Assignee: Sunpower, Inc., Athens, OH (US)

(21) Appl. No.: 10/217,897

(22) Filed: Aug. 14, 2002

Related U.S. Patent Documents

Reissue of:
(64) Patent No.: 5,873,246
Issued: Feb. 23, 1999
Appl. No.: 08/760,041
Filed: Dec. 4, 1996

(51) Int. Cl.[7] ..... F01B 29/10
(52) U.S. Cl. ..... 60/520
(58) Field of Search ..... 60/517, 520

(56) References Cited

U.S. PATENT DOCUMENTS 4,404,802 A * 9/1983 Beale ..... 60/520
4,583,364 A * 4/1986 Wood ..... 60/520

* cited by examiner

*Primary Examiner*—Noah P. Kamen
(74) *Attorney, Agent, or Firm*—Jason J. Foster; Kremblas, Foster, Phillips & Pollick

(57) ABSTRACT

A centering apparatus for a free piston Stirling engine including a pressure regulator valve which connects a passageway between the work space and the back space when both (a) the average pressure in the back space exceeds the average pressure in the work space as a result of the piston deflecting a spring, and simultaneously (b) the instantaneous pressure in the back space exceeds the instantaneous pressure in the work space. A diaphragm spans across an actuator housing cavity, dividing the cavity into an upper chamber and a lower chamber. A connector valve is linked to the diaphragm for opening and closing the valve upon displacement of the diaphragm. When the average back space pressure exceeds the average work space pressure, the diaphragm is displaced to open the valve, connecting the work space and the back space in fluid communication. A check valve permits the flow of gas in only one direction: from the back space to the work space. A similar arrangement can be included to also cause flow from the work space to the back space when the average work space pressure exceeds the average back space pressure, so as to center the piston against leaks in either direction.

9 Claims, 5 Drawing Sheets

PISTON POSITION

CENTERING SYSTEM FOR FREE PISTON MACHINE

Matter enclosed in heavy brackets [ ] appears in the original patent but forms no part of this reissue specification; matter printed in italics indicates the additions made by reissue.

TECHNICAL FIELD

The present invention relates to an apparatus for centering the piston of a free piston machine, such as a Stirling cycle engine or heat pump, at a desired mean operating position. It relates specifically to a centering system which vents gas from the space at a first end of the piston to the space at the second end of the piston when the average piston position creeps away from its design center position toward the second end.

BACKGROUND ART

A free piston Stirling machine typically comprises a housing having a cylinder containing a linearly reciprocating power piston and a linearly reciprocating displacer. The piston divides the interior of the housing into two gas spaces. One space is a work space bounded by the piston on the displacer side of the piston, and the other is a back space or bounce space bounded by the other side of the piston. Heat is supplied to the gas in the work space and together with the piston and displacer cooperates to cyclically compress and expand the gas to convert a portion of the supplied heat into mechanical work. The piston and displacer reciprocate in periodic, although out of phase, relation. Heat is removed from the gas in the work space in an amount equal to the difference in the heat supplied and the work produced as required by the first and second laws of thermodynamics. A regenerator device is employed for regenerating some of the heat supplied from one cycle to the next. The working gas in the engine may be air, hydrogen, helium, other gases, vapors or liquids, or the like.

While reference is made to a Stirling engine, the invention is applicable to other free piston machines such as heat pumps and refrigerators and to other free piston machines such as a free piston compressor. In such heat pumping Stirling applications, the direction of the heat and work energy interactions are reversed. The term Stirling machine is intended to refer to Stirling cycle engines, heat pumps, and refrigerators.

Sealing means are provided between the power piston and the inner wall of the housing for substantially sealing the work space from the back space. The sealing means may be in the form of rings or simply a precision fit. In either case, since the piston must be free to reciprocate in the housing, taking into account effects such as thermal expansion, a small annular gap unavoidably exists between the piston and the housing. The working gas may flow between the work and back spaces through the interposed annular gap with the direction of flow being from high to low pressure. The working gas, therefore, will leak from the work space to the back space when the work space pressure is higher than the back space pressure and in the reverse direction when the pressure difference is reversed.

The back space in Stirling machines is generally designed to have a relatively large volume and, consequently, the pressure of the gas in the back space remains approximately constant during operation. The pressure in the work space, however, undergoes large amplitude changes over the cycle. The work space pressure, when viewed as a function of time, appears as a pressure wave having a series of peaks which rise rapidly above the back space pressure. The peaks are followed by a longer interval of time wherein the work space pressure is slightly below the back space pressure until the next peak occurs. The pressure wave increases and decreases in asymmetric relation to the back space pressure. Although the peaks in the pressure wave last for only a short period of time in relation to the overall period of the cycle, there is a strong tendency for net gas leakage from the work space to the back space (outward) due to the nonlinearity of the pressure and flow rate relationship. For the interval of time following the peak where the back space pressure is higher than the work space, the flow will be in the opposite direction (inward). However, due to the nonlinear flow, the gas flow during this interval will be substantially less than during the peak. Over the period of the cycle some of the flow is inward and some of the flow is outward. However, the usual effect of the nonlinearity of the flow is a net transfer of gas from the work space to the back space. This or any other cause of asymmetric leak increases the volume of gas in the back space and decreases the volume of gas in the work space which causes the piston to creep inward from its design mean position.

Imperfections in the piston and housing fit may cause the piston to creep outwardly. However, in a precisely formed engine the nonlinear relation between pressure and flow generally gives rise to an inward creep. Creep in either direction makes it difficult to control the piston position and may degrade engine performance. In other free piston machines a different asymmetrical pressure wave in the work space can also cause inward or outward creep.

Most approaches for automatically centering the piston of a free piston Stirling machine have involved a gas porting system for periodically returning the asymmetrically leaked gas from the back space to the work space. For example, U.S. Pat. No. 4,583,364 teaches a method and apparatus comprising a center port and a passageway which is periodically opened by the power piston, thereby permitting a corrective inward flow of gas to balance the outward asymmetric leak. That patent further teaches the use of a displacer having a sealing surface which periodically registers with a port along the passageway to block the outward flow of gas on the piston return (outward) stroke. Prohibiting the flow of gas during the outward stroke improves power output since there will be no gas transfer from the work space to the back space as would otherwise occur.

U.S. Pat. No. 4,404,802 teaches the use of a centering port system which is opened and closed by the ports of a spool valve coming into registry. The work space and back space are brought into fluid communication during both the inward and outward strokes of the piston so that there is gas flow through the centering port system in both directions. In this mode, both inward and outward creep are balanced. That patent does not contemplate a one way centering port. Centering port systems of the type described are generally formed in a portion of the cylinder part of housing and may also include passageways and ports in the piston. They also include a valve linked to the piston which opens at or near the design mean piston operating position. Typically, the valve is formed to interrupt flow in the centering passageway and is a spool valve arrangement in which the piston functions as the spool which covers and uncovers one or more ports in the cylinder or central post to connect the work space and the second space in communication when the piston is near its center position.

Therefore, in summary, in a free piston Stirling cycle machine, an asymmetric pressure wave in the work space causes a problem of keeping the piston centered as a result of a preferential leak from the work space to the back space behind the piston. This results in a creep of the average piston position away from its desired center position as a result of a migration of some fluid mass from one space to the other. A conventional method to prevent this inward creep is to allow a communication between work and back spaces through ports in the equivalent of a spool valve mounted on or connected to the piston which come into coincidence at the center of the stroke, so that a flow of fluid can result between the two spaces and allow the average mass in the two spaces to remain fixed and thus the piston to remain centered. This is the accepted way to keep the piston centered, however a power loss penalty accrues from the fact that gas flows both in and out at each passage of the piston both on its in and out passage by the center port.

BRIEF DISCLOSURE OF INVENTION

The invention is an improved piston centering apparatus for a free piston machine having a housing. The housing includes a cylinder, and a piston is sealingly reciprocatable in the cylinder. The free piston machine includes a spring connected between the piston and the housing, said spring being relaxed and exerting substantially no force on the piston when the piston is in a centered position. The housing encloses a first machine space bounded by a first end of the piston, and encloses a second machine space bounded by the opposite, second end of the piston. The second machine space has a working fluid with an average fluid pressure, and the first machine space has a working fluid with a fluid pressure varying periodically in opposite directions from said average pressure. The pressure variation causes a net leakage flow of working fluid from the first machine space to the second machine space. The improvement comprises a connector valve through which the first and second machine spaces are connected. A valve actuator is linked to the connector valve and the actuator has a first actuator chamber and a second actuator chamber for opening the connector valve in response to the pressure of the second actuator chamber exceeding the pressure of the first actuator chamber. The first actuator chamber is connected in communication with the first machine space, through a restriction for maintaining a pressure in the first actuator chamber equal to the average pressure in the first machine space. The second actuator chamber is connected in communication with the second machine space. A check valve is directed to permit a flow of working fluid from the first machine space to the second machine space when the connector valve is open.

The invention preferably contemplates that the free piston machine is a free piston Stirling cycle machine, the first machine space is the work space of the Stirling cycle machine, and the second machine space is the back space of the Stirling cycle machine.

Figure 1:
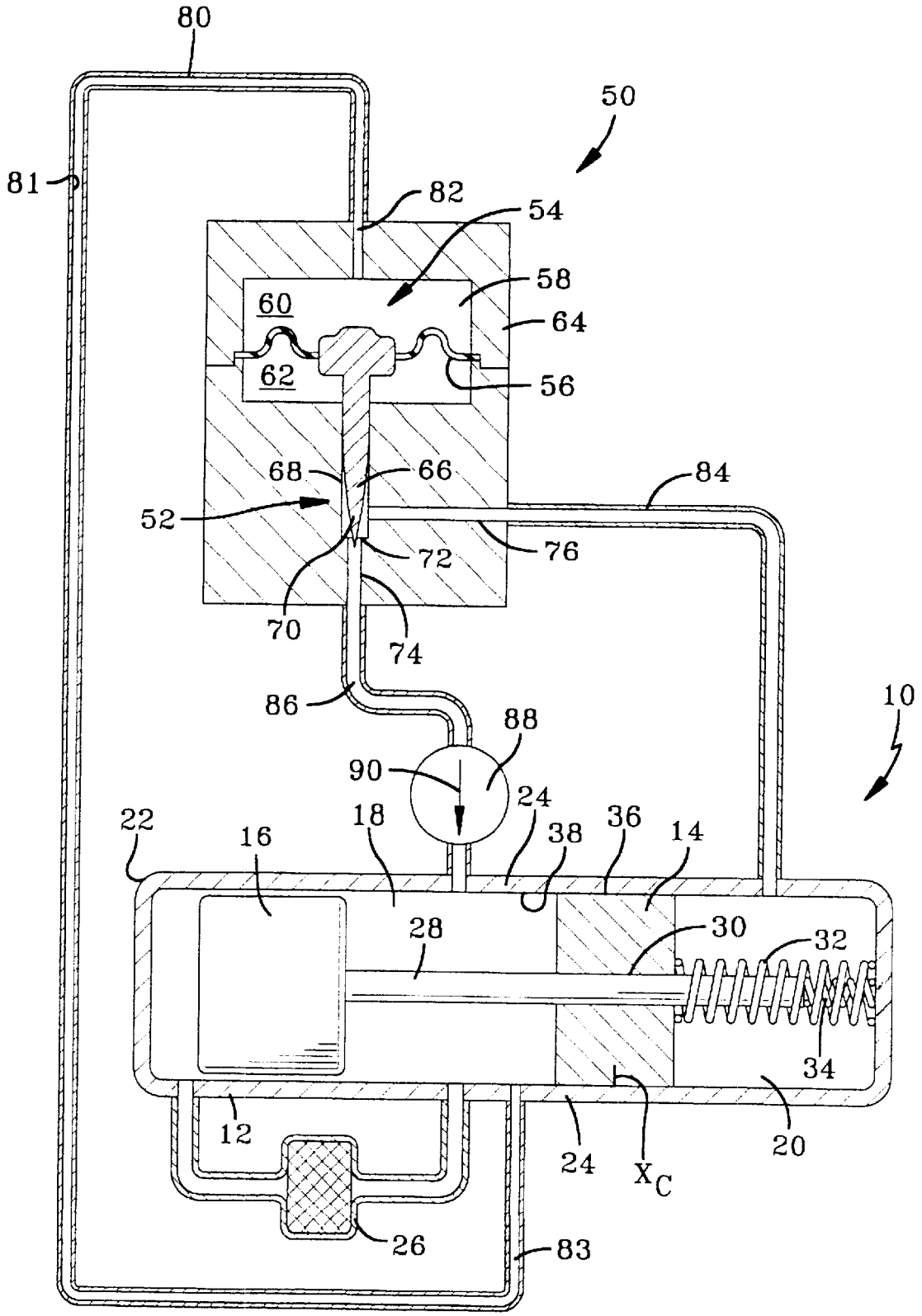
FIG. 1 is a side view in section illustrating a free piston Stirling cycle engine with the preferred centering system attached thereto.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the word connected or terms similar thereto are often used. They are not limited to direct connection but include connection through other elements where such connection is recognized as being equivalent by those skilled in the art.

DETAILED DESCRIPTION

Referring to FIG. 1, a free piston Stirling engine 10 comprises a housing 12, a reciprocating power piston 14, and a reciprocating displacer 16. The piston 14 bounds and, in combination with the interior of the housing 12, defines a work space 18 on the displacer side of the piston 14. The opposite end of the piston 14 similarly bounds the back space 20. The work space 18 and back space 20 contain the same working gas.

For driving the engine, heat is supplied to the hot end 22 of the work space 18 and removed from the cool end 24. The flow of heat combined with the reciprocation of the displacer 16 induces the gas in the work space 18 to cyclically expand and contract. The piston 14 and the displacer 16 are thereby driven to reciprocate in the housing 12 for producing mechanical work according to well known thermodynamic principles of the prior art.

As is also well known in the art, the engine 10 is provided with a regenerator 26 which acts to regenerate heat in the engine 10 from one cycle to the next. The motion of the power piston 14 towards the work space 18 is referred to as inward motion, while piston motion toward the back space 20 is referred to as outward motion. In one possible mode, the piston 14 is mechanically coupled to a magnet (not shown) which is reciprocated in an electrical alternator apparatus for converting the mechanical work produced by the piston 14 into electrical energy.

A displacer rod 28 passes slidingly through the piston 14 through a central hole 30 in the piston 14. The piston 14 and displacer 16 are provided with mechanical springs 32 and 34, respectively, for resonating the piston 14 at the desired frequency of reciprocation. Other equivalent devices, such as gas or magnetic springs, could substitute for the springs 32 and 34. As is well known to those familiar with free piston Stirling machines there are a variety of different structural alternative morphologies for arranging the basic components of a Stirling machine to which the present invention is applicable. The designed mean position of the piston 14 is labeled $X_C$.

An exterior wall 36 of the reciprocating piston 14 is sized to have a precision fit within the cylinder defined by the interior wall 38 of the housing 12. The precision fit which also permits relative sliding reciprocation requires an annular gap therebetween. Although not shown, the piston 14 may be provided with a gas bearing means which provides a thin layer of pressurized gas in the annular gap for lubrication. While the dimensions will vary from one size machine to another, for a 5 kW rated engine, the gap width is preferably between 20 and 30 microns. Similarly, the displacer 16 may be provided with a gas bearing means for lubricating the displacer motion in the housing, as well as a gas bearing means between the displacer rod 28 and a piston hole 30. Alternative lubrication means are possible as is known to those of skill in the art.

Figure 2:
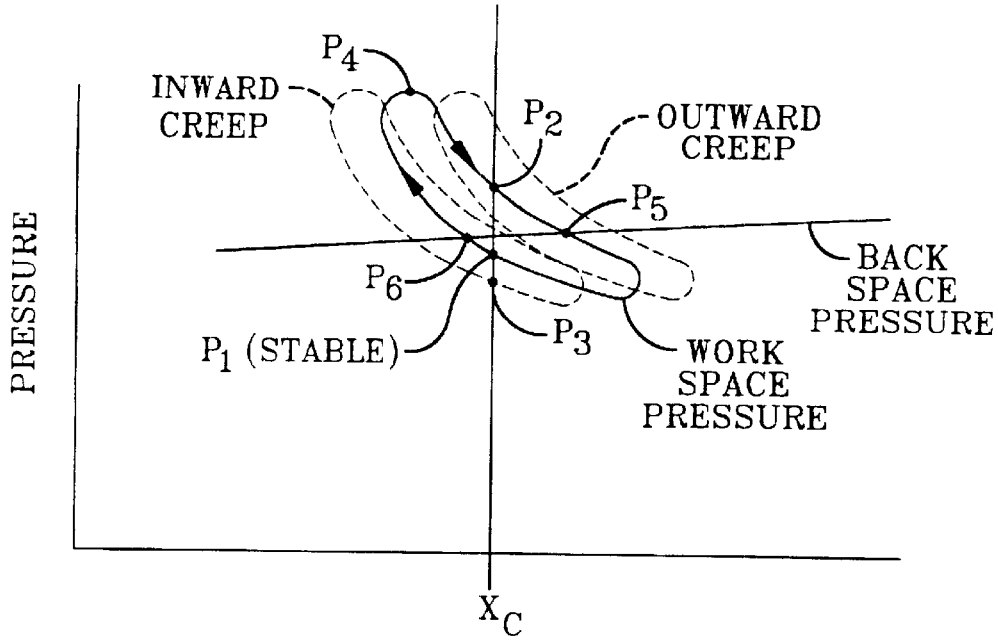
FIG. 2 is a graphical illustration of the variation of the work space and back space pressure as a function of piston position.

FIG. 2 illustrates graphically the variation in the work space and back space pressures as a function of piston position during the engine cycle. The back space 20 is typically designed to have a volume significantly larger than the work space 18, although this is not apparent from FIG. 1. Therefore, the back space pressure remains approximately constant over the cycle. The work space pressure, however, is seen to undergo large variations over the cycle with the peak pressure occurring at point $P_4$. Points $P_5$ and $P_6$ represent the points in the cycle where the work space pressure and back space pressure are equal. As described with reference to FIG. 1, the desired mean piston operating position is labeled as $X_C$.

Figure 3:
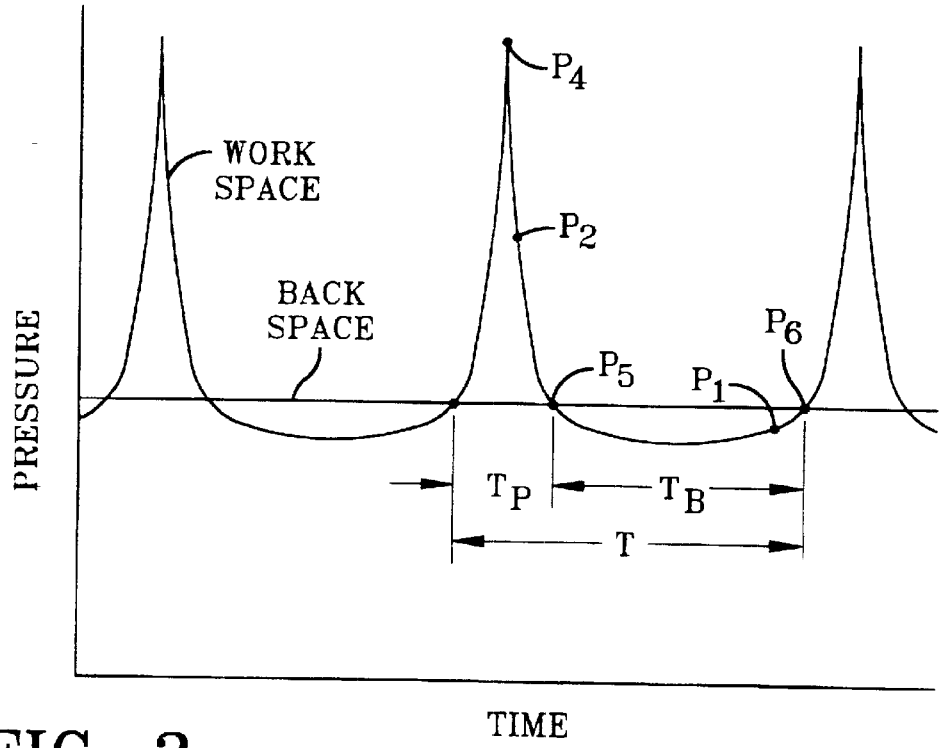
FIG. 3 is a graphical illustration of the work space and back space pressures as a function of time.

FIG. 3 shows the work and back space pressures as a function of time, and it is seen that the work space pressure comprises a peak-type waveform having a period T. The pressure wave further comprises subintervals $T_P$ having peak $P_4$, and subinterval $T_B$ wherein the work space pressure is slightly lower than the back space pressure, the interval $T_P$ being shorter in duration than $T_B$.

During interval $T_P$ the working gas will flow from the work space 18 to the back space 20 (outward) through the annular gap between the piston 14 and the wall 38. However, during interval $T_B$ the flow direction will be reversed (inward) according to the well known principle of a gas tending to flow from high to low pressure. As described above, there is a net leakage flow resulting from the asymmetry of the leakage which increases the mass of gas in the back space and decreases the mass of gas in the work space, which together cause the piston to creep inwardly. The inward creep is represented on the cycle diagram of FIG. 2 by a broken line. It is a principal object of the present invention to provide a one way valve which causes low power loss while permitting the centering system to automatically and more precisely maintain the mean position of piston 12 at $X_C$, thereby giving precise control of the piston position.

Referring again to FIG. 1, a pressure regulator 50 is shown attached to the free piston Stirling engine 10. The pressure regulator 50 consists of a connector valve 52 and a valve actuator 54. The valve actuator 54 includes a diaphragm 56 which extends across a cavity 58, dividing the cavity 58 into a first actuator chamber 60 and a second actuator chamber 62. The periphery of the diaphragm 56 is clamped in place between separate portions of the pressure regulator housing 64.

A needle 66 extends downwardly from, and is drivingly linked to, the diaphragm 56. The needle 66 is longitudinally, slidably mounted in an aperture, preferably the cylindrical bore 68 formed in the pressure regulator housing 64. A pointed needle tip 70 can be moved into and out of registration with the shoulder 72, thereby closing and opening the valve 52, respectively. The shoulder 72 is the circumferential edge of the end of a passageway 74 formed in the pressure regulator housing 64. The diaphragm 56 can be displaced upwardly and downwardly in the embodiment shown in FIG. 1, thereby displacing the needle 66 within the cylindrical bore 68. At its lowest extreme, the pointed end 70 seats against and registers with the shoulder 72, thereby closing the end of the passageway 74. This is the relaxed, normally closed position which exists when there is no pressure differential across the diaphragm. A second passageway 76 extends from the cylindrical bore 68, and is in fluid communication with the passageway 74 when the valve 52 is open (i.e. when the pointed end 70 is unseated from against the shoulder 72). A fluid conveying tube 84 connects the passageway 76 with the back space 20, permitting relatively unrestricted fluid communication between the back space 20 and the passageway 76.

The diaphragm 56 is forced upwardly, which raises the needle 66, when the pressure in the chamber 62 exceeds the pressure in the chamber 60. The diaphragm 56 is displaced in the opposite direction, which lowers the needle 66, when the pressure in the chamber 60 equals or exceeds the pressure in the chamber 62. The chamber 60 is in fluid communication with the work space 18 through a passageway formed in a fluid conveying tube 80. The tube 80 connects to the pressure regulator housing 64 and a passageway 82 is interposed between the chamber 60 and the passageway 81 formed in the tube 80, connecting them. The pressure in the actuator chamber 60 is substantially equal to the average pressure in the work space 18, because only a slow rate of fluid flow is permitted through the passageway 83 which filters the high frequency cycling of pressure. This rate of fluid flow can be caused by any suitable restriction, such as the passageway 83 having a restrictive orifice, or the passageway 83 being a restrictive capillary passageway.

Because the pressure in the back space 20 is essentially constant, the chamber 62 can be in unrestricted communication with the back space 20 via a duct extending from the passageway 76. The duct, which is the gap between the needle 66 and cylindrical bore 68, does not need to be restrictive if the back space pressure varies only slightly from its average pressure. However, if there are significant variations in the back space pressure, the flow path between the chamber 62 and the back space 20 must be suitably restrictive in order to provide the average pressure of the back space 20 in the chamber 62. A suitable restriction is a capillary tube (not shown in FIG. 1) connecting the passageway 76 with the chamber 62, or a restrictive orifice (not shown in FIG. 1) in a duct connecting the passageway 76 with the chamber 62.

A tube 86 connects the passageway 74 with a check valve 88 interposed along the length of the tube 86, and connects the passageway 74 in relatively unrestricted fluid communication with the work space 18. The check valve 88, however, permits gas to flow in an unrestricted manner only in the direction of the arrow 90, not in the opposite direction. Higher pressure in the passageway 74 than in the work space 18 causes the check valve 88 to open, thereby permitting gas to flow from higher to lower pressure. The check valve 88 closes, however, to prevent gas flow in the opposite direction. The check valve 88 is conventional in its operation and could be substituted by one of many well known equivalents.

Working gas within the free piston Stirling engine 10 can flow without significant restriction through the tube 84, and can flow without significant restriction toward the work space 18 in the tube 86, but as explained above, not in the opposite direction. Therefore, when the needle 66 is displaced upwardly out of its contact with the shoulder 72, the valve 52 is open, and working gas in the back space 20 is able to flow to the work space 18. However, in order for the working gas to flow in this direction, the instantaneous pressure (i.e. the actual pressure at a given moment as contrasted with the average pressure) of the working gas in the back space 20 must exceed the instantaneous pressure of the working gas in the work space 18.

In summary, working gas only flows from the back space 20 to the work space 18 when two conditions are met simultaneously. First, the average pressure in the back space 20 must exceed the average pressure in the work space 18 to cause the connector valve 52 to open. Secondly, the instantaneous pressure in the backspace 20 must exceed the instantaneous pressure in the work space 18 for gas to flow in the permitted direction. It is only when both of these conditions are met simultaneously that the present invention operates to permit the flow of gas from the back space 20 to the work space 18. When the first condition exists, the diaphragm 56 is displaced upwardly due to the pressure in the chamber 62 exceeding the pressure in the chamber 60. This upward displacement raises the needle 66, opening the valve 52, which connects the back space 20 with the work space 18. If the second condition is met (i.e. the pressure in the back space 20 exceeds the pressure in the work space 18) at the same time as the first, then the check valve 88 is forced open to permit a flow of gas from the back space 20 to the work space 18. This flow of gas stops when either or both of the two conditions cease to be met.

The operation of the embodiment shown in FIG. 1 can be discussed in view of the pressures in the work space 18 and the back space 20 as illustrated in FIG. 3. The back space pressure is illustrated as an essentially flat line, since the high volume back space 20 usually has essentially constant pressure. The instantaneous pressure in the work space is represented by the work space curve, which has regular peaks. When the piston is centered the average work space pressure equals the back space pressure.

However, the average work space pressure can vary due to the asymmetric leakage discussed above. The average work space pressure decreases below the back space pressure if the piston 14 creeps away from its centered position described above. The back space pressure increases because the spring 32 is elongated away from its relaxed design center position by the volume increase, causing the piston 14 to exert an average force on the increased volume of gas in the back space 20. When the average work space pressure falls below the back space pressure (indicating creep) the needle valve opens. Then, during any part of the cycle during which the work space pressure falls beneath the back space pressure, working gas flows through the check valve 88 from the back space 20 into the work space 18.

Although the preferred application of the present invention is with a free piston Stirling engine, it can also be applied to a free piston machine having a piston which creeps in an opposite direction. In order to illustrate how this is done, a schematic diagram of first the preferred and then a possible alternative embodiment of the invention will be described.

Figure 4:
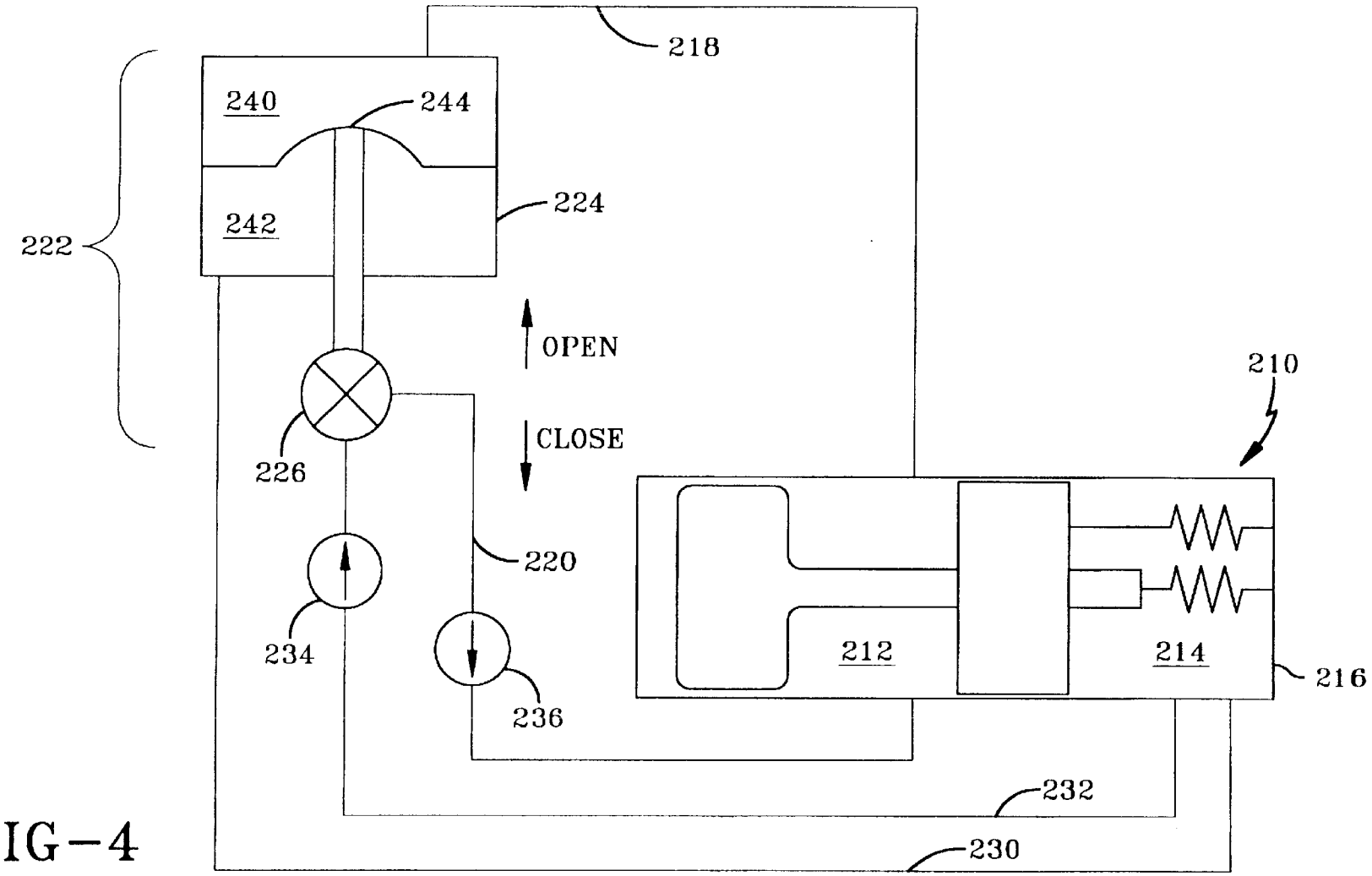
FIG. 4 is a schematic view in section illustrating an embodiment of the present invention.

FIG. 4 shows a schematic diagram of an alternative embodiment which illustrates principles of the invention and in which a Stirling engine 210 has a work space 212 and a back space 214 within a housing 216. Tubes 218 and 220 extend from the work space 212 to a regulator valve 222. The regulator valve includes an actuator 224 and a connector valve 226 as in the preferred embodiment. A pair of tubes 230 and 232 connect the back space 214 with the regulator valve 222. Check valves 234 and 236 are shown attached to the tubes 232 and 220, respectively. Only one of the check valves needs to be present in a given system, but both check valves are shown to illustrate two possible alternative locations of the check valve. The tubes 218 and 230 connect the work space 212 and the back space 214, respectively, with the actuator chambers 240 and 242, respectively. The tubes 218 and 230 have restrictions in them, if necessary, to provide the chambers 240 and 242 with the average pressure of the gas in the portion of the Stirling engine 210 to which they are connected.

When a diaphragm 244 is displaced upwardly by the pressure in the chamber 242 exceeding the pressure in the chamber 240, the connector valve 226 is opened permitting a flow of gas from the back space 214 to the work space 212. This is similar in effect to the preferred embodiment.

Figure 5:
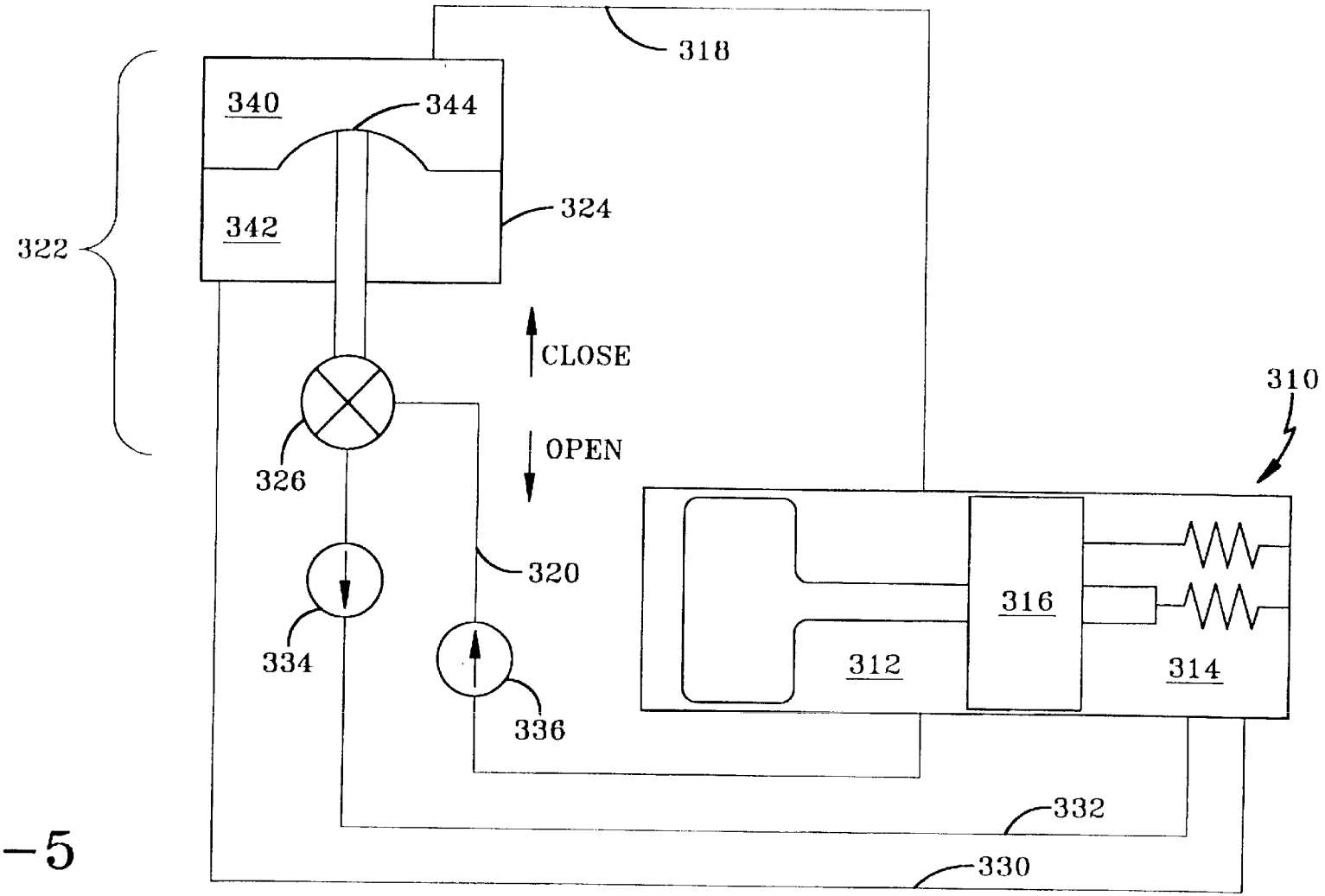
FIG. 5 is a schematic view in section illustrating an alternative embodiment of the present invention.

A schematic diagram of a device very similar to that shown in FIG. 4 is shown in FIG. 5, including a Stirling engine 310 having a work space 312 and a back space 314. However, in the case of the Stirling engine 310, the piston 316 tends to creep toward the back space 314, rather than the work space as in the Stirling cycle engine used with the preferred embodiment.

Tubes 318 and 320 connect the work space 312 with the pressure regulator 322. A connector valve 326 is drivingly linked to a diaphragm 344 which separates the cavity of an actuator 324 into first and second chambers 340 and 342. The tubes 330 and 332 connect the back space 314 with the actuator 324 and the connector valve 326, respectively.

The orientation of the check valves 334 and 336 is reversed from the embodiment of FIG. 4, because the flow of gas in a Stirling engine having a piston which creeps toward the back space should be directed from the work space 312 toward the back space 314. Additionally, the connector valve 326 opens when the diaphragm 344 is displaced downwardly due to the pressure in the chamber 340 exceeding the pressure in the chamber 342. This is the opposite of the actuator 224 shown in FIG. 4.

The comparison of the embodiment shown in FIG. 4 and that shown in FIG. 5 is to illustrate that the principle of attaching a pressure regulator valve including an actuator and a connector valve to a free piston machine according to the invention applies to more than merely free piston Stirling engines. Virtually any free piston machine having a piston which creeps in one direction due to asymmetric pressure variations can be restrained with low energy losses using the present invention.

The energy losses of the present invention are lower than conventional centering devices because working gas flows to re-center the piston only once the piston becomes off-center. In the conventional centering devices, gas flows through passageways on each stroke, using significant amounts of power merely to drive the gas through the passageways.

In addition to low energy consumption, the invention can be altered to the application of a particular machine because the invention consists essentially of multiple inputs. There are two inputs to the valve actuator which transmit to the chambers of the valve actuator the average pressures of the work space and the back space. The inputs to the valve actuator determine whether the connector valve will be opened. If the direction in which the piston creeps from center is reversed for a different machine, reversal of the inputs to the valve actuator, and reversal of the check valve, is all that is necessary.

Figure 6:
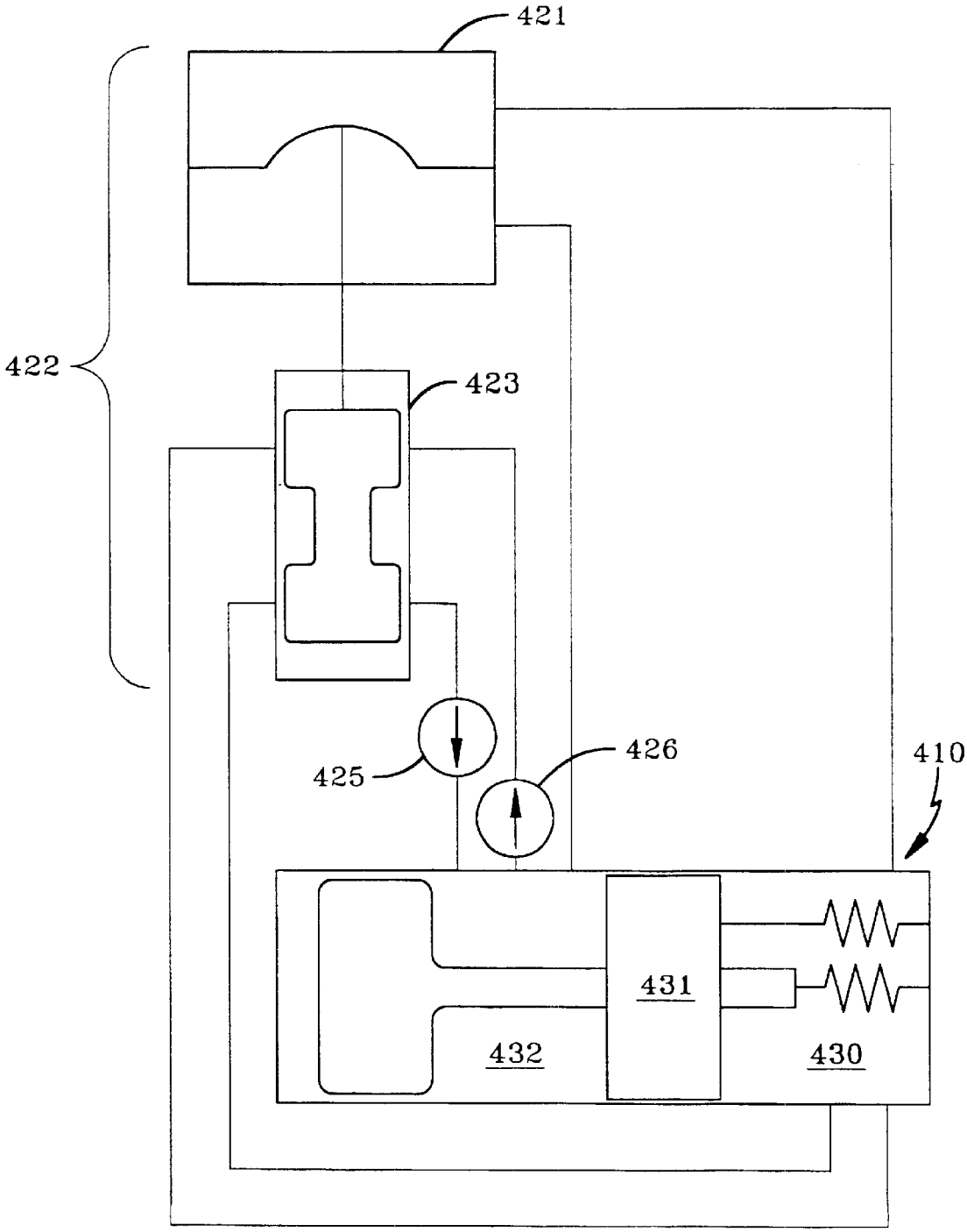
FIG. 6 is a schematic view illustrating an alternative embodiment of the present invention.

In addition to machines having piston creep in only one direction, it is possible to connect a pressure regulator to a machine having a potential for piston creep in either direction. A schematic diagram of such a device is shown in FIG. 6. The machine 410 is connected to the pressure regulator 422 which consists of a diaphragm valve actuator 421 and a double acting spool valve 423. With the apparatus of FIG. 6, the piston 431 creeps toward the back space when the asymmetric gas flow causes a net transfer of gas to the work space. When the average pressure of the work space 432 exceeds the average pressure of the back space 430, and the instantaneous pressure of the work space 432 exceeds the instantaneous pressure of the back space 430, the pressure regulator 422 will cause the spool valve 423 to open a passageway connecting the spaces, permitting gas to flow from the work space to the back space through check valve 426. When the piston 431 creeps in the opposite direction, the spool valve 423 is opened, connecting the spaces, but with check valve 425 permitting gas flow only from the back space to the work space.

While certain preferred embodiments of the present invention have been disclosed in detail, it is to be understood that various modifications may be adopted without departing from the spirit of the invention or scope of the following claims.

I claim:

1. An improved piston centering apparatus for a free piston machine having a housing, including a cylinder and a piston sealingly reciprocatable in the cylinder, and a spring connected between the piston and the housing, said spring being relaxed and exerting substantially no force on the piston when the piston is in a centered position, said housing enclosing a first machine space bounded by a first end of the piston and also enclosing a second machine space bounded by the opposite, second end of the piston, the second machine space having a working fluid with an average fluid pressure and the first machine space having a working fluid with a fluid pressure varying periodically in opposite directions from said average pressure, said pressure variation causing a net leakage flow of working fluid from the first machine space to the second machine space, wherein the improvement comprises:

(a) a connector valve through which the first and second machine spaces are connected;

(b) a valve actuator linked to the connector valve, the actuator having a first actuator chamber and a second actuator chamber for opening the connector valve in response to the pressure of the second actuator chamber exceeding the pressure of the first actuator chamber, the first actuator chamber connected in communication with the first machine space through a restriction for maintaining a pressure in the first actuator chamber substantially equal to the average pressure in the first machine space, and the second actuator chamber connected in communication with the second machine space; and (c) a check valve directed to permit a flow of working fluid from the [first] *second* machine space to the [second] *first* machine space when the connector valve is open.

2. An apparatus in accordance with claim 1, wherein the free piston machine is a free piston Stirling cycle machine, the first machine space is a work space and the second machine space is a back space.

3. An apparatus in accordance with claim 2, wherein the first chamber of the actuator is connected in fluid communication with the work space of the machine, and the second chamber of the actuator is connected in fluid communication with the back space of the machine.

4. An apparatus in accordance with claim 1, wherein the actuator includes a housing having a cavity formed within the actuator housing, and a diaphragm divides the cavity into the first and second actuator chambers.

5. An apparatus in accordance with claim 4, wherein the connector valve comprises a needle drivingly linked to the diaphragm and movably mounted in an aperture formed in the actuator housing, for being displaced in response to displacement of the diaphragm, thereby opening and closing the connector valve.

6. An apparatus in accordance with claim 1, wherein the restriction is an orifice of predetermined size.

7. An apparatus in accordance with claim 1, wherein the restriction is a capillary tube of predetermined size.

8. An apparatus in accordance with claim 1, wherein the free piston machine is a free piston Stirling cycle machine, the first machine space is a back space and the second machine space is a work space.

9. An apparatus in accordance with claim 1, wherein the invention further comprises a second connector valve through which the first and second machine spaces are connected, a second check valve directed to permit a flow of working fluid from the second machine space to the first machine space when the second connector valve is open, and wherein the valve actuator is linked to the second connector valve for opening the second connector valve in response to the pressure of the first actuator chamber exceeding the pressure of the second actuator chamber.

* * * * *